United States Patent [19]

Harris et al.

[11] Patent Number: 4,668,592
[45] Date of Patent: May 26, 1987

[54] ELECTROCHEMICAL CELL HAVING POROUS METAL COUPLING MEMBERS

[75] Inventors: Peter B. Harris, Dedham; Franz Goebel, Sudbury; Gerard H. Boyle, Concord; William T. McHugh, Westwood, all of Mass.

[73] Assignee: GTE Government Systems Corporation, Waltham, Mass.

[21] Appl. No.: 743,182

[22] Filed: Jun. 10, 1985

[51] Int. Cl.[4] .................... H01M 6/32; H01M 2/26
[52] U.S. Cl. .................................... 429/116; 429/161
[58] Field of Search ............... 429/113, 116, 154, 161, 429/162

[56] References Cited

U.S. PATENT DOCUMENTS

| | | | |
|---|---|---|---|
| 3,100,164 | 8/1963 | Solomon et al. | 429/116 |
| 4,148,974 | 4/1979 | Eppley | 429/113 |
| 4,283,470 | 8/1981 | Freeman et al. | 429/209 |
| 4,471,035 | 9/1984 | Goebel et al. | 429/154 |
| 4,535,038 | 8/1985 | Boyle et al. | 429/154 |

Primary Examiner—Donald L. Walton
Attorney, Agent, or Firm—J. Stephen Yeo

[57] ABSTRACT

An electrochemical cell has a generally cylindrical battery stack comprised of disc-shaped components including alternating first polarity electrodes and second polarity electrodes. Adjacent first polarity electrodes are coupled by ring-shaped coupling members. The coupling members are made of porous metal which allows the passage of a liquid cell component from a central well into the battery stack.

5 Claims, 2 Drawing Figures

ELECTROCHEMICAL CELL HAVING POROUS METAL COUPLING MEMBERS

The U.S. Government has rights to the invention under Contract F-33615-81-2088.

REFERENCE TO RELATED COPENDING APPLICATIONS

Ser. No. 743,188, filed 06/10/85, Electrochemical Cell Having Coupling Members with Radial Channels and Ser. No. 743,177 filed 06/10/85, Electrochemical Battery Containing Unitary Flapper Valve pertain to subject matter related to that of the present application.

BACKGROUND OF THE INVENTION

This invention pertains to electrochemical cells and, more particularly, is concerned with means to electrically and mechanically link-like electrodes in such cells.

Electrochemical cells usually have two sets of electrodes of different priorities and a liquid cell component. In order to increase the current capacity of a cell, a plurality of electrodes of a given polarity are connected together in electrical parallel. Difficulties in connecting the electrode occur when the electrode material is soft such as lithium or porous carbon.

Freeman et al in U.S. Pat. No. 4,283,470 "Anode Structure for an Electrochemical Cell" describes an anode structure including a resilient contact member secured to a lithium disc by barbs. The contact member is generally circular and has a central hole rimmed with teeth. The anode structure can be stacked on a central tube, with the teeth locking the anode structure in place. While this arrangement has performed satisfactorily, electrical communication between anodes relies on a tube which adds to cost and weight.

In reserve type cells, the liquid cell component is left separate from the solid battery stack until activation.

It is an object of the invention to provide an electrochemical cell with coupling members which provide mechanical and electrical contact between like polarity electrodes while also allowing liquid cell components to flow into the battery stack.

SUMMARY OF THE INVENTION

Briefly, according to one aspect of the invention, an electrochemical cell has pairs of electrodes of the same polarity electrically connected together by a porous metal member interposed between electrodes.

DESCRIPTION OF THE INVENTION

Figure 1:
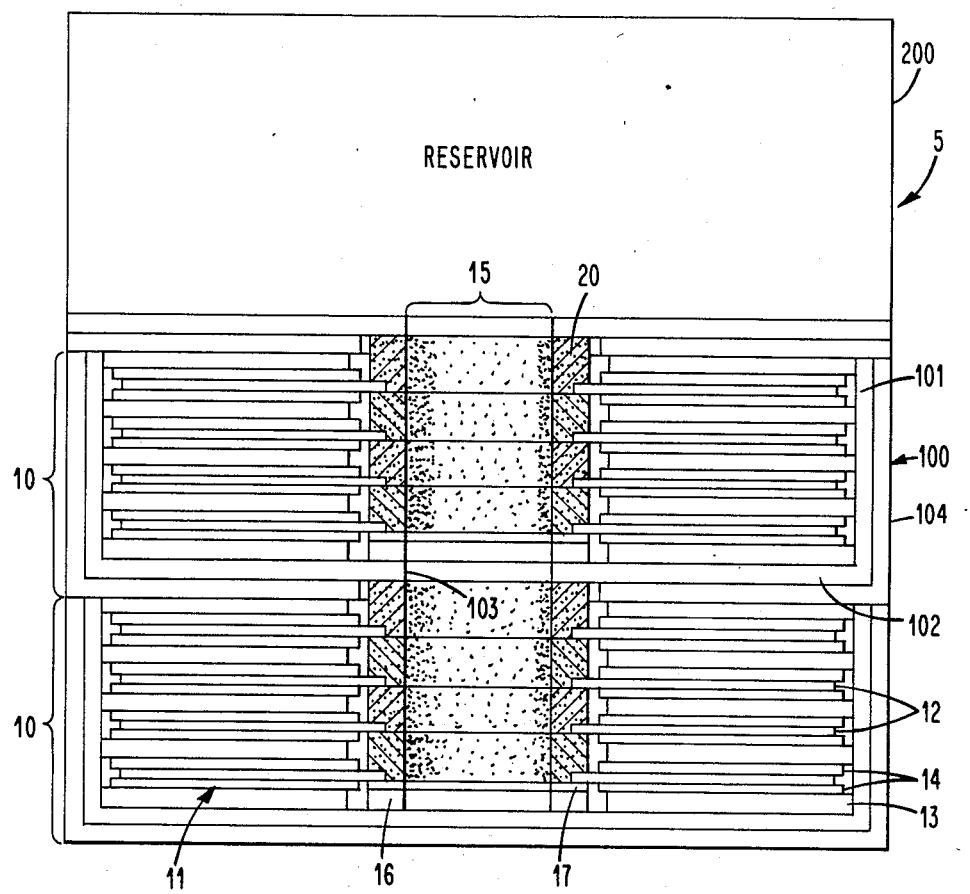
FIG. 1 is a cross-section view of a battery of electrochemical cells embodying an aspect of the invention.

Turning first to FIG. 1, there is seen a battery 5 of electrochemical cells 10 embodying the invention. Each cell 10 includes a housing 100 containing a battery stack 11. For clarity, the thickness of the battery stack components are exaggerated.

The battery stack 11 includes first polarity electrodes 12 alternating with second polarity electrodes 13. Each set of electrodes of the same polarity are connected in electrical parallel. First polarity electrodes may be electrically separated and insulated from second polarity electrodes by interposed porous insulating sheets 14. The cell 10 is activated when the battery stack 11 is in contact with a liquid cell component. The cell may be stored with the liquid cell component stored in a reservoir 200, separated from the battery stack until activation is desired. In high energy density cells, the first polarity electrodes may be lithium metal, and the second polarity electrodes may include porous carbon. The liquid cell component may be a solution of thionyl chloride and lithium tetrachloroaluminate. The porous insulating sheets 14 may be made of glass fibers.

The battery stack illustrated is generally cylindrical with the electrodes 12, 13 and insulating sheets 14 formed as discs with central holes. Housing 100 has a generally cylindrical metal side 101 and a flat metal bottom 102. The center of the battery stack may include a coaxial void known as a well 15 through which the liquid cell component may be introduced to the battery stack 11 from reservoir 200.

Figure 2:
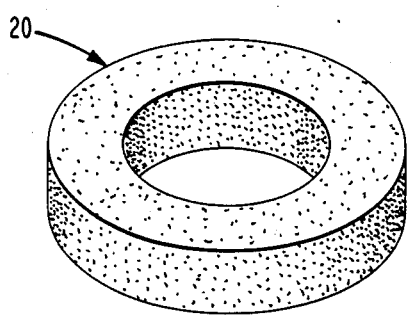
FIG. 2 illustrates a coupling member used in the cell of FIG. 1.

As a feature of the invention, porous coupling members 20 made of porous metal are pressed into facing surfaces of adjacent first polarity electrodes to make both electrical and mechanical contact. The porous coupling members allow the liquid cell component to enter the battery stack from the well. A porous coupling member 20 is seen best in FIG. 2. The porous coupling members work best if the electrodes are made of a soft material such as lithium metal or porous carbon.

Returning to FIG. 1, the first polarity electrode disc 12 is alternately arranged with the second polarity electrode disc 13. Thin porous insulating sheets 14 are interleaved between adjacent electrode discs.

The first polarity electrode discs 12 have a smaller inside and outside diameter than the second polarity electrode discs 13. The porous coupling members 20 are arranged in contact with the inner edge of first polarity electrode disc 12 but not with the second polarity electrode discs 13. The outer edge of the second polarity electrodes 13 make contact to the housing side 101. The porous coupling members 20 should have about the thickness of second polarity electrodes 13 and two insulating sheets 14. The bottommost coupling member is insulated from the bottom 102 of housing 100 by an insulating disc 16.

As a second feature of the invention, the porous metal coupling members 20 are welded together so that they provide structural strength to the assembled battery stack.

The porous coupling members are preferably 5% to 20% by volume metal which is permeated with approximately 30 mil (0.76 millimeter) pores and may be stamped out of commercially available sheets of porous metal. Sheets of porous nickel are available from Astro-Mel Associates, Cincinnati, Ohio. Sheets of nickel-chromium are available from Foametal Industries, Willoughby, Ohio. A range of 20 mils to 50 mils press is satisfactory.

Each housing 100 is capped with a cover. If two or more cells are connected in electrical series to form a battery, the cover may be the bottom of the next higher cell housing. In this situation, wells in adjacent cells are coupled by a hole 103 through the intermediate housing bottom. The first polarity electrodes of the lower cell are electrically coupled to the housing of the upper cell by a compression or welded contract. In the case of a compression contact, a resilient member 17 such as a spring wave washer urges the coupling members upward against the metal bottom of the next higher cell housing. The cell housings of adjacent cells are electrically insulated from each other and may have a plastic coating 104 for insulation.

Having described the preferred embodiment of the invention, we claim:

1. An electrochemical cell comprised of:
   a plurality of first polarity electrodes and a plurality of second polarity electrodes alternately arranged in a battery stack; and
   a plurality of porous coupling members made of porous metal positioned between and in contact with the facing surfaces of adjacent first polarity electrodes thereby providing meachanical and electrical coupling between said first polarity electrodes while allowing liquid communication with said electrodes.

2. The electrochemical cell of claim 1 wherein said coupling members are welded together.

3. The electrochemical cell of claim 1 wherein 5% to 20% of the volume of said coupling member is metal, and 95% to 80% of the volume consists of pores permeating said metal.

4. The electrochemical cell of claim 3 wherein the size of said pores is about in the range of 20 mils to 50 mils and said metal is nickel.

5. The electrochemical cell of claim 3 wherein the size of said pores is in the range of 20 mils to 50 mils and said metal is nickel chromium.

* * * * *